May 7, 1963 A. HAREL 3,088,668

BINARY ADDER EMPLOYING MINORITY LOGIC

Filed Sept. 14, 1960

INVENTOR.
Abraham Harel
BY John V. Regan
Attorney

United States Patent Office 3,088,668
Patented May 7, 1963

3,088,668

BINARY ADDER EMPLOYING MINORITY LOGIC

Abraham Harel, Framingham, Mass., assignor to Radio Corporation of America, a corporation of Delaware Filed Sept. 14, 1960, Ser. No. 55,978
4 Claims. (Cl. 235—176)

The present invention relates to a new and improved binary adder.

The adder of the invention consists of six identical minority gates or, more broadly speaking, of five such gates and an inverter. Signals indicative of the input addend, augend and carry quantities are applied to a first of the minority gates to obtain a "carry not" output signal. This and signals indicative of different pairs of input quantities are applied to three other of the minority gates. The outputs of these three gates are applied to a fifth minority gate to obtain the sum output. The "carry not" output may be applied to an inverter to obtain a carry output.

The invention is described in greater detail below and is illustrated in the following drawing of which:

A minority gate is a device or circuit which has multiple inputs and a single output. The value of the output is the value of the minority of the inputs. To avoid the indeterminate case, there must be an odd number of inputs.

Figure 1:
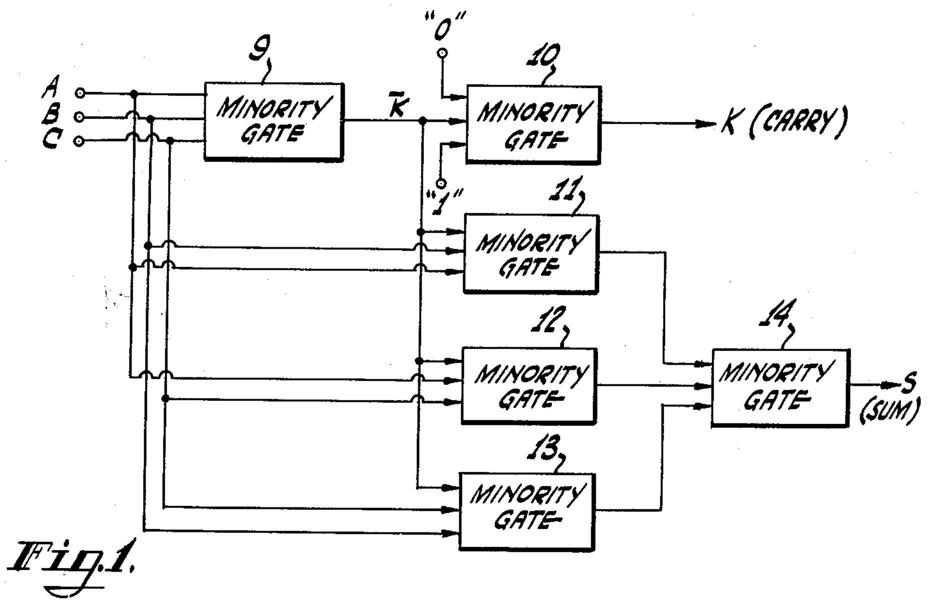
FIG. 1 is a block circuit diagram of an adder according to the invention.

The binary full adder of FIG. 1 consists of six minority gates of the type described above. The inputs to the gates are signals indicative of the addend (A), augend (B) and carry (C) quantities. A negative voltage of the order of −6 volts or so represents the binary digit "one" and the absence of a negative voltage represents the binary digits "zero." For the sake of the explanation which follows, it is hereafter stated that the binary digit "one" or "zero" rather than a signal or voltage indicative of the binary digit is applied to the gate.

The input addend A, augend B, and carry C quantities are applied to minority gate 9. The output of this minority gate is "carry not" $\overline{K}$ and it is applied to a second minority gate 10. A binary "zero" is applied to the second input to minority gate 10 and a binary "one" is applied to the third input to minority gate 10. So connected, minority gate 10 functions as an inverter, as is described in more detail later. The output of minority gate 10 is the carry K signal.

The input quantities A and B and also $\overline{K}$ are applied to minority gate 11. The input quantities A and C and also $\overline{K}$ are applied to minority gate 12. The input quantities B and C and also $\overline{K}$ are applied to minority gate 13. The outputs of minority gates 11, 12, and 13 are applied to the sixth minority gate 14. As is explained in more detail later, the output of minority gate 14 is the sum S signal.

The operation of the full adder of FIG. 1 is fully described in the truth table below.

| A | B | C | $\overline{K}$ | Output of— | | | S | K |
|---|---|---|---|---|---|---|---|---|
| | | | | 11 | 12 | 13 | | |
| 0 | 0 | 0 | 1 | 1 | 1 | 1 | 0 | 0 |
| 0 | 0 | 1 | 1 | 1 | 0 | 0 | 1 | 0 |
| 0 | 1 | 0 | 1 | 0 | 1 | 0 | 1 | 0 |
| 0 | 1 | 1 | 0 | 1 | 1 | 0 | 0 | 1 |
| 1 | 0 | 0 | 1 | 0 | 0 | 1 | 1 | 0 |
| 1 | 0 | 1 | 0 | 1 | 0 | 1 | 0 | 1 |
| 1 | 1 | 0 | 0 | 0 | 1 | 1 | 0 | 1 |
| 1 | 1 | 1 | 0 | 0 | 0 | 0 | 1 | 1 |

Put into words, the truth table above states that a sum of "one" is produced by the full adder when one or three of the input quantities A, B and C are "one." A carry of "one" is produced when two or three of the inputs are "one."

The operation of the circuit may perhaps be better understood by one example. Assume that the A input is "zero" and the B and C inputs are "one." In this case, minority gate 9 produces an output of "zero." Minority gate 10 has one "zero" input and one "one" input continuously applied. Therefore, it acts as an inverter since a $\overline{K}=0$ input produces a "1" output and a $\overline{K}=1$ input produces a "0" output. Accordingly, for the example given, minority gate 10 produces a $K=1$ output. This agrees with the truth table above.

The input to minority gate 11 is $\overline{K}=0$, $A=0$ and $B=1$. Accordingly, this minority gate produces a "one" output. The input to minority gate 12 is $\overline{K}=0$, $A=0$ and $C=1$. Accordingly, this minority gate produces a "one" output. The inputs to minority gate 13 are $\overline{K}=0$, $B=1$ and $C=1$. Accordingly, minority gate 13 produces a "zero" output.

The three inputs to minority gate 14 are 1, 1, 0. Accordingly, the output of this minority gate is $S=0$. This agrees with the truth table above. If the circuit operation is traced for other inputs in a manner similar to that discussed above, the outputs listed in the truth table are obtained.

Figure 2:
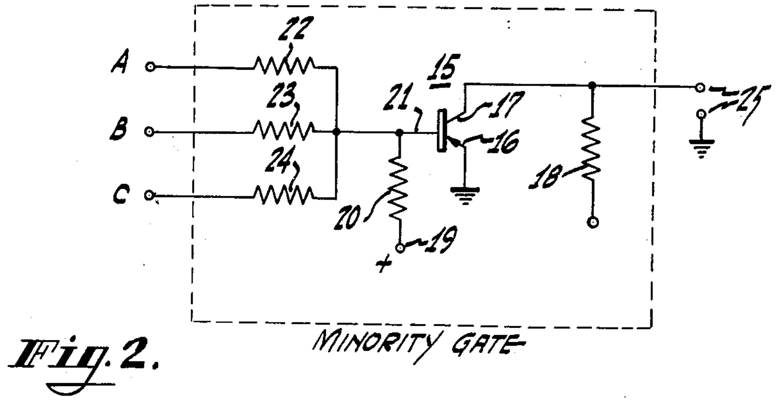
FIG. 2 is a schematic circuit diagram of a minority gate which may be used in the circuit of FIG. 1.

Any one of a number of minority gates may be employed in the circuit of FIG. 1. A specific one which is especially suitable since it can respond to an alternating (pulse type) or a direct current signal is shown in FIG. 2. The gate includes a PNP transistor 15 the emitter 16 of which is connected to ground. The collector 17 of the transistor is connected through a load resistor 18 to a source of negative voltage such as −6 volts. A reverse bias voltage of sufficient amplitude to maintain the transistor cut-off until two input signals are simultaneously applied to the transistor is connected from terminal 19 through resistor 20 to the base 21. The input A, B and C signals are applied through coupling resistors 22, 23 and 24 to the base 21 of the transistor. As already mentioned, an input signal indicative of the binary digit "zero" is 0 volt and one indicative of the binary digit "one" is −6 volts. Likewise, an output signal indicative of the binary digit "zero" is substantially 0 volt and one indicative of the binary digit "one" is −6 volts.

The circuit of FIG. 2 operates as follows. When the A, B and C inputs are all binary "zero" (0 volt), transistor 21 is cut off and binary "one" (−6 volts) appears across output terminals 25. When one of the three inputs is a binary "one" (−6 volts) and the other two are binary "zero" (0 volt), the transistor 15 remains cut-off and the output available at terminals 25 is binary "one" (−6 volts).

When two or more of the inputs are binary "one," the transistor 15 is driven into heavy conduction and a binary "zero" (0 volt) appears at output terminals 25.

The circuit of FIG. 2 is useful not only in the full adder of FIG. 1 but as a so-called "flexible logic element." For example, with control voltages indicative of the binary digits "zero" and "one" applied to two of the three input leads to the circuit, respectively, the minority gate becomes an inverter, as already described in connection with the full adder. If one of the three input leads to the minority gate, e.g. input C, is always a "one," the minority gate becomes a "nor" circuit for the two variable signals A, B such that its output is $\overline{A+B}$ as indicated in the truth table below.

| A | B | C | 0 |
|---|---|---|---|
| 0 | 0 | 1 | 1 |
| 0 | 1 | 1 | 0 |
| 1 | 0 | 1 | 0 |
| 1 | 1 | 1 | 0 |

If one of the three inputs, e.g. input C, is always a binary "zero," the minority gate becomes a "negative and" or "nand" circuit for the two variable signals A, B such that its output is $\overline{AB}$ as illustrated in the truth table below.

| A | B | C | 0 |
|---|---|---|---|
| 0 | 0 | 0 | 1 |
| 0 | 1 | 0 | 1 |
| 1 | 0 | 0 | 1 |
| 1 | 1 | 0 | 0 |

One of the three inputs may be an independent variable, or, if desired, a dependent variable—i.e. an output of another logic element—as in the case of the adder described above. Elements 11, 12, 13 in FIG. 1 function either as "nor" or as "nand" gates, each for another pair of the three inputs to the adder, depending on whether their control input $\overline{K}$, which may be thought of as a dynamic control voltage, is "one" or "zero" respectively.

What is claimed is:

1. A binary adder comprising, in combination, a first minority gate to which input addend, augend, and carry signals are applied for producing a carry-not output signal; second, third and fourth minority gates to each of which different combinations of two of the three of said input signals are applied and to each of which the carry-not output signal is applied; and a fifth minority gate to which the output signals of said second, third and fourth minority gates are applied for producing a sum signal.

2. A binary adder comprising, in combination, a first minority gate to which input addend, augend, and carry signals are applied for producing a carry-not output signal; second, third and fourth minority gates to each of which different combinations of two of the three of said input signals are applied and to each of which the carry-not output signal is applied; a fifth minority gate to which the output signals of said second, third and fourth minority gates are applied for producing a sum signal; and an inverter to which the carry-not output signal is applied for producing a carry output signal.

3. A binary adder comprising, in combination, a first minority gate to which input addend, augend, and carry signals are applied for producing a carry-not output signal; second, third and fourth minority gates to each of which different combinations of two of the three of said input signals are applied and to each of which the carry-not output signal is applied; a fifth minority gate to which the output signals of said second, third and fourth minority gates are applied for producing a sum signal; and a sixth minority gate to which the carry-not output signal is applied and signals indicative of the binary digits "one" and "zero" are also applied for producing the carry output signal.

4. A binary adder as set forth in claim 3, wherein said minority gates are all identical, each comprising a three input transistor-amplifier biased sufficiently beyond cut off to require the concurrent application of at least two input signals indicative of the binary digit "one" to be driven into substantial conduction.

References Cited in the file of this patent

UNITED STATES PATENTS

| | | |
|---|---|---|
| 2,780,409 | Hardenbergh | Feb. 5, 1957 |
| 2,850,647 | Fleisher | Sept. 2, 1958 |
| 2,952,407 | Weiss et al. | Sept. 13, 1960 |
| 2,977,486 | Dobbie | Mar. 28, 1961 |
| 2,999,637 | Curry | Sept. 12, 1961 |